United States Patent
Wang et al.

(10) Patent No.: US 9,916,750 B2
(45) Date of Patent: Mar. 13, 2018

(54) METHOD AND DEVICE FOR REMINDING BASED ON ALARM CLOCK

(71) Applicant: Xiaomi Inc., Beijing (CN)

(72) Inventors: Hongqiang Wang, Beijing (CN); Yi Gao, Beijing (CN); Hai Long, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/130,097

(22) Filed: Apr. 15, 2016

(65) Prior Publication Data

US 2016/0307434 A1 Oct. 20, 2016

(30) Foreign Application Priority Data

Apr. 16, 2015 (CN) .......................... 2015 1 0181426

(51) Int. Cl.
*G08B 21/24* (2006.01)
*H04M 1/725* (2006.01)
*G04G 13/02* (2006.01)
*G06Q 10/10* (2012.01)

(52) U.S. Cl.
CPC .......... *G08B 21/24* (2013.01); *G04G 13/026* (2013.01); *H04M 1/72522* (2013.01); *G06Q 10/109* (2013.01)

(58) Field of Classification Search
CPC ............ G04G 13/026; H04M 1/72522; G06Q 10/109
See application file for complete search history.

(56) References Cited

U.S. PATENT DOCUMENTS

| 2002/0099550 A1 | 7/2002 | Emerick, Jr. |
| 2002/0186618 A1 | 12/2002 | Kirkpatrick |
| 2007/0072629 A1* | 3/2007 | Bae .................. H04M 1/72566 |
| | | 455/461 |
| 2008/0102786 A1 | 5/2008 | Griffin |
| 2010/0085841 A1* | 4/2010 | Lazaridis ............. G04G 13/026 |
| | | 368/73 |

(Continued)

FOREIGN PATENT DOCUMENTS

| CN | 101571710 A | 11/2009 |
| CN | 102082855 A | 6/2011 |

(Continued)

OTHER PUBLICATIONS

International Search Report of PCT Application No. PCT/CN2015/095131, dated Feb. 2, 2016, issued by the State Intellectual Property Office of P.R. China as ISA (4 pages).

(Continued)

*Primary Examiner* — Mohamed Barakat
(74) *Attorney, Agent, or Firm* — Finnegan, Henderson, Farabow, Garrett & Dunner LLP

(57) ABSTRACT

A method for a terminal to perform reminding includes outputting first reminding information according to a first event alarm of an event flow alarm clock at a first reminding time of the first event alarm. The event flow alarm clock contains at least two event alarms. The method further includes, when there exists a second event alarm having a second reminding time later than the first reminding time, outputting second reminding information according to the second event alarm at the second reminding time.

15 Claims, 10 Drawing Sheets

(56) References Cited

U.S. PATENT DOCUMENTS

| | | | | |
|---|---|---|---|---|
| 2011/0148606 A1* | 6/2011 | Glee | ................ | G06Q 10/1091 |
| | | | | 340/309.7 |
| 2014/0104993 A1* | 4/2014 | Shields | ................ | G04G 13/026 |
| | | | | 368/74 |
| 2015/0281377 A1* | 10/2015 | Qi | ........................ | H04W 4/206 |
| | | | | 709/203 |

FOREIGN PATENT DOCUMENTS

| | | | | |
|---|---|---|---|---|
| CN | 102624915 A | 8/2012 | | |
| CN | 102821374 A | 12/2012 | | |
| CN | 103458091 A | 12/2013 | | |
| CN | 103634468 A | 3/2014 | | |
| CN | 102413416 B | 4/2014 | | |
| CN | 104821987 A | 8/2015 | | |
| JP | H11-344584 | 12/1999 | | |
| JP | 2008181289 A | 8/2008 | | |
| KR | 20070012904 A | 1/2007 | | |
| KR | 1020060076420 | 10/2007 | | |
| WO | WO 2011041868 A1 * | 4/2011 | ............ | G04G 13/02 |
| WO | WO 2013/139066 | 9/2013 | | |

OTHER PUBLICATIONS

English version of International Search Report of PCT Application No. PCT/CN2015/095131, dated Feb. 2, 2016, issued by the State Intellectual Property Office of P.R. China.
Extended Search Report for European Application No. 1615179.9 from the European Patent Office, dated Sep. 1, 2016.

* cited by examiner

METHOD AND DEVICE FOR REMINDING BASED ON ALARM CLOCK

CROSS-REFERENCE TO RELATED APPLICATIONS

The present application is based upon and claims priority to Chinese Patent Application No. 201510181426.6, filed Apr. 16, 2015, the entire contents of which are incorporated herein by reference.

TECHNICAL FIELD

The present disclosure generally relates to terminals and, more particularly, to a method and device for reminding based on an alarm clock.

BACKGROUND

Terminals, such as mobile devices, tablet computers, and personal digital assistants (PDAs) all have an alarm clock function, which gradually replaces the traditional alarm clock, bringing more convenience for users.

SUMMARY

In accordance with the present disclosure, there is provided a method for a terminal to perform reminding. The method includes outputting first reminding information according to a first event alarm of an event flow alarm clock at a first reminding time of the first event alarm. The event flow alarm clock contains at least two event alarms. The method further includes, when there exists a second event alarm having a second reminding time later than the first reminding time, outputting second reminding information according to the second event alarm at the second reminding time.

Also in accordance with the present disclosure, there is provided a terminal including a processor and a memory storing instructions that, when executed by the processor, cause the processor to output first reminding information according to a first event alarm of an event flow alarm clock at a first reminding time of the first event alarm. The event flow alarm clock contains at least two event alarms. The instructions further cause the processor to, when there exists a second event alarm having a second reminding time later than the first reminding time, output second reminding information according to the second event alarm at the second reminding time.

Also in accordance with the present disclosure, there is provided a non-transitory computer-readable storage medium having stored therein instructions that, when executed by one or more processors of a mobile terminal, cause the mobile terminal to output first reminding information according to a first event alarm of an event flow alarm clock at a first reminding time of the first event alarm. The event flow alarm clock contains at least two event alarms. The instructions further cause the mobile terminal to, when there exists a second event alarm having a second reminding time later than the first reminding time, output second reminding information according to the second event alarm at the second reminding time.

It is to be understood that both the foregoing general description and the following detailed description are exemplary and explanatory only and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used herein are merely for describing a particular embodiment, rather than limiting the present disclosure. As used in the present disclosure and the appended claims, terms in singular form such as "a", "said," and "the" are intended to also include plural forms, unless explicitly dictated otherwise. It should also be understood that the term "and/or" used herein means any one or any possible combination of one or more associated listed items.

Further, although an element may be described with a term first, second, or third, etc., the element is not limited by these terms. These terms are merely for distinguishing elements of the same kind. For example, without departing from the scope of the present disclosure, a first element can also be referred to as a second element. Similarly, a second element can also be referred to as a first element. Depending on the text, a term "if" as used herein can be interpreted as "when", "where," or "in response to".

Figure 1:
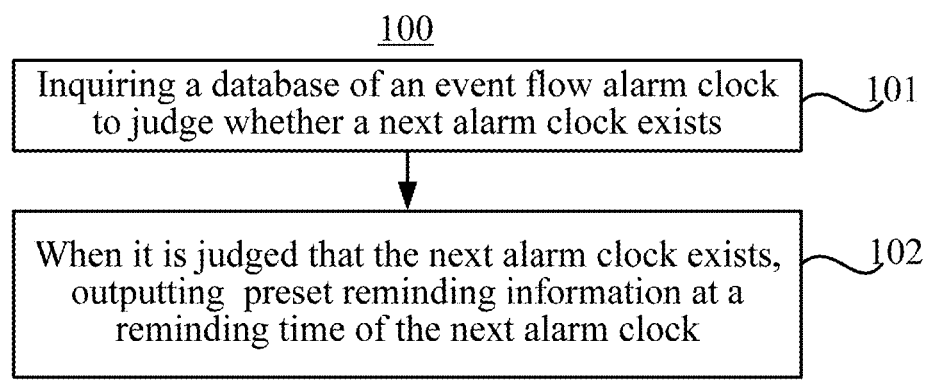
FIG. 1 is a flow chart showing a method for reminding according to an exemplary embodiment of the present disclosure.

FIG. 1 is a flow chart showing a method 100 for reminding according to an exemplary embodiment of the present disclosure. The method 100 can be implemented, for example, in a terminal or a server. The terminal supports an alarm clock function and can be, for example, a smart phone, a tablet computer, or a personal digital assistant (PDA).

As shown in FIG. 1, at 101, a database of an event flow alarm clock is queried to judge whether a next event alarm exists.

In some embodiments, the event flow alarm clock contains at least two event alarms, each of which contains at least one event. The event flow alarm clock is turned on and off as a whole. In some embodiments, respective events in the event flow alarm clock are correlated with each other. Reminding times and reminding information of respective event alarms are stored in a database of the event flow alarm clock. For example, the event flow alarm clock can include: waking at 7:00, leaving home at 7:30, entering subway at 7:40, exiting subway at 8:30, having breakfast at 8:45, arriving at company at 8:55. In this example, 7:00, 7:30, 7:40, and 8:30 are reminding times; and waking, leaving home, entering subway, exiting subway, and arriving at company are reminding information. The database can be stored in a cloud server or locally in the terminal.

If the database is stored in the cloud server, the event flow alarm clock can be run in the cloud server. When the cloud server locates a reminding time of an event alarm contained in the event flow alarm clock, the cloud server reads corresponding reminding information of the event alarm in the database and sends the reminding information to the terminal. The terminal outputs the reminding information for a preset time length to remind a user. For example, the preset time length can be one minute, and the reminding information is closed after one minute has passed. To set up the database, the cloud server can first acquire event information, such as respective time points of grabbing a red envelope from Alipay (an application for payment), and then establish the database of the event flow alarm clock based on the acquired information.

In some embodiments, even if the database is stored in the cloud server, the terminal can also acquire the database from the cloud server, and run the event flow alarm clock locally. The terminal reads reminding times and reminding information of respective event alarms contained in the event flow alarm clock, and monitors the system time. When the reminding times arrive, the terminal outputs corresponding reminding information. To acquire the database from the cloud server, the terminal sends a request for acquiring the database to the cloud server, receives information of the database sent by the cloud server, and runs or installs the event flow alarm clock locally.

If the database is stored locally in the terminal, the terminal can query the database and read the reminding time and reminding information corresponding to the next event alarm. The terminal outputs the reminding information for a preset time length when the reminding time arrives. The reminding information can be one or more of a ring tone, a voice, a video, and a picture.

To set the reminding times and the reminding information, the terminal first detects a request for adding an event flow alarm clock input by a user. In some embodiments, the terminal can provide two alarm clock functions, i.e., an ordinary alarm clock and an event flow alarm clock, for the user to select. The ordinary alarm clock refers to an alarm clock function provided in the terminal according to conventional technologies, in which respective event alarms are mutually independent. With the ordinary event alarm application, when a certain event alarm is turned on, the terminal only reminds the user when a time corresponding to the event alarm arrives.

After detecting the request, the terminal displays an event flow alarm clock setting page for the user to set. The setting page can include an event flow alarm clock ID, repetition, remark, and an event alarm ID list, as shown in Table 1.

TABLE 1

Data Table for Setting Event Flow Alarm clock

| Column name | Explanation |
| --- | --- |
| Event flow alarm clock ID | Unique identification of corresponding event flow alarm clock |
| Repetition | Repeating date of corresponding event flow alarm clock |
| Remark | Description of corresponding event flow alarm clock |
| Event alarmt ID list | IDs of respective event alarms contained in corresponding event flow alarm clock |

Event flow alarm clock ID is a unique identification of the event flow alarm clock, which can be manually input by the user or automatically generated by the terminal.

Repetition refers to whether the event flow alarm clock as a whole is repeated, rather than whether a certain event alarm contained in the event flow alarm clock is repeated. For example, a time of the event flow alarm clock may be set by checking any one day or more days from Monday to Sunday.

Remark contains descriptions of the event flow alarm clock. For example, the remark can be a recipe of eggplant with chilli and potato, or a weekday event alarm.

Event alarm ID list is a list of respective event alarms contained in the event flow alarm clock. Each event alarm also has a unique ID, which may be manually input by the user or automatically generated by the terminal.

The user can add event alarms or set respective event alarms contained in the event flow alarm clock. Specifically, for an event alarm, the user can set, for example, a reminding time, a reminding manner (corresponding to reminding information), a reminding volume, a remark, or a label. The reminding time can be manually input by the user or selected from a time list provided by the system. Alternatively, one or more existing alarm clocks can be added to the event flow alarm clock as event alarms.

In the scenario that the reminding time is manually inputted by the user, the terminal can receive a time input by the user and store the inputted time as the reminding time of the event alarm being set.

In the scenario that the reminding time is selected from the time list provided by the system, the terminal can output and display the time list, receive the time selected by the user from the time list, and store the selected time as the reminding time of the event alarm being set.

In the scenario that an existing alarm clock is selected as the event alarm, the terminal can query and display a list of unique identifications of existing alarm clocks. According to a unique identification selected by the user from the list, the terminal can select a corresponding alarm clock as the event alarm being added and set a reminding time of the corresponding alarm clock as the reminding time of the event alarm being added.

For example, a workday event flow alarm clock can include six event alarms that need to be set. The ordinary alarm clock database has stored therein a plurality of alarm clocks, including waking at 7:00 and arriving at company at 8:55. In this scenario, the system can display IDs of all the stored alarm clocks. The user can select the IDs of the two alarm clocks from the displayed IDs. Based on the IDs selected by the user, the terminal adds the corresponding alarm clocks as two of the six event alarms to the database of the event flow alarm clock. Then the remaining four event alarms in the event flow alarm clock can be set according to other methods described above. By selecting an existing alarm clock as an event alarm in an event flow alarm clock, less time is needed to create new event alarms.

In addition, an existing alarm clock can be edited. For example, the terminal can provide an editing interface for the user to reselect a reminding time and/or other settings of the alarm clock. After the setting is finished, the edited alarm clock can be saved and added to the database of the event flow alarm clock.

In some embodiments, the reminding time can be set by setting time intervals between respective event alarms. First, the reminding time of a first event alarm contained in the event flow alarm clock is set. For a second event alarm to a last event alarm contained in the event flow alarm clock, a time interval between an event alarm being set and a previous event alarm can be set successively. Based on the time interval and the reminding time of the previous event alarm, the reminding time of the event alarm being set can be calculated.

For example, for the recipe alarm clock, sometimes it is difficult to determine when to begin cooking. In this scenario, it is more convenient to set time intervals between respective event alarms. For example, a time interval between the first event alarm and the second event alarm can be set to 10 minutes, and a time interval between the second event alarm and the third event alarm can be set to 8 minutes. The time of the first event alarm can be set based on experience. When the cooking cannot be started at a planned time, only the time of the first event alarm needs to be modified to a time that the user intends to do cooking. The terminal can automatically calculate reminding times of subsequent event alarms according to the time intervals. As such, the user does not need to modify or reset each and every event alarm.

The reminding manner and reminding information can also be set according to different scenarios. For example, when the reminding information includes a ring tone, a built-in ring tone or vibration of the terminal, or a ring tone recorded or downloaded by the user can be used. When the reminding information includes a voice, a recorded voice or a downloaded voice can be used. When the event flow alarm clock is a recipe event alarm, each cooking step corresponds to one event alarm, and voice is more suitable to be used as the reminding information. When the reminding information is an image-text, it can be a built-in picture of the terminal, a downloaded picture, or text edited by the user. For example, when the event flow alarm clock is the recipe alarm clock, a picture corresponding to the current step can be displayed simultaneously, to provide more intuitive and friendly reminding to the user. As another example, when the event flow alarm clock is a workday alarm clock, a picture of a smiling face or hard working can be displayed at the same time when the waking event alarm ring tone rings, which can give the user more motivation to get up. When the reminding information is a short video, a recorded or downloaded video can be used. Generally, the reminding time length is from a half minute to two minutes. That is, the time length of the ring tone, the voice, the video, or displaying the image/text is from a half minute to two minutes.

The volume in reminding information can be manually set by the user according to personal preference.

According to the present disclosure, the remark or label of an event alarm can be set, i.e., a description corresponding to the event alarm can be added. For example, when the event flow alarm clock is a workday event alarm, labels corresponding to respective event alarms can include, e.g., "waking," "conference," and/or "meeting client." When the event flow alarm clock is a recipe event alarm, the labels can include, e.g., "adding salt," "stirring for the first time," and "adjusting oven temperature to 170 degrees." Thus, the user can be reminded from various aspects.

In some embodiments, when an event alarm is being added to an event flow alarm clock, a reminder can be displayed to ask the user whether the adding is finished. If the user selects no, an event alarm setting page is output for the user to continue the setting.

In some embodiments, when the adding for respective event alarms in the event flow alarm clock is all accomplished, the event flow alarm clock can be saved every time the setting of an event alarm is finished and after the entire event flow alarm clock is set. The entire event flow alarm clock can be edited or deleted. Alternatively or in addition, the event alarms can also be edited or deleted individually.

The event flow alarm clock according to the present disclosure is suitable for many scenarios. For example, since an office worker usually has a fixed schedule during a workday, a workday event flow alarm clock can be suitable and can be set according to experience. Specifically, a waking event alarm can be set for 7:00 to leave enough time for cleaning up and dressing up. A leaving home event alarm can be set for 7:30 to avoid the crowd on the subway. An entering subway event alarm can be set for 7:40 to leave enough time for breakfast before work An existing subway event alarm can be set for 8:30 to avoid missing the stop A breakfast event alarm can be set for 8:40 to guarantee not to miss the work time and ensure energy and efficiency for working in the morning. An arriving at company event alarm can be set for 8:55 to guarantee not to be late and to leave enough time to enter the working state.

According to the present disclosure, after a previous event alarm finishes reminding, the terminal queries and judges whether the next event alarm exists based on the event alarm ID list in the database of the event flow alarm clock.

At 102, when it is judged that the next event alarm exists, reminding information associated with the next event alarm is outputted at the reminding time of the next event alarm.

If the database is stored locally in the terminal, when the terminal locates the next event alarm, the terminal reads the reminding time of the next event alarm. When the reminding time arrives, the terminal outputs a reminder according to a reminding manner corresponding to the event alarm, that is, the reminding information is outputted. If no next event alarm is located, that is, no next event alarm exists, the terminal outputs a reminder that the event flow alarm clock finishes.

In some embodiments, even if an event flow alarm clock has not finished, the terminal can turn off the event flow alarm clock and stops reading the database of the event flow alarm clock if it receives a cancelling instruction or an aborting instruction from the user. When all event alarms in the event flow alarm clock have finished reminding, the terminal outputs a reminder that the event flow alarm clock has finished. After that, if the user has set repetition, the terminal will continue to read the database of the event flow alarm clock according to the set repetition time. If the user did not set repetition, the terminal turns off the event flow alarm clock and stops reading the database of the event flow alarm clock.

In the scenario that the database is stored in the cloud server, when the reminding time arrives, the cloud server sends the reminding information to the terminal. The terminal outputs the reminding information to remind the user.

Table 2 is a data table of the event flow alarm clock.

TABLE 2

Data Table of Event Flow Alarm Clock

| Column name | Explanation |
| --- | --- |
| Event flow alarm clock ID | Unique identification of corresponding event flow alarm clock |
| Beginning time of event flow alarm clock | Time at which event flow alarm clock starts |
| Finishing time of event flow alarm clock | Time at which event flow alarm clock finishes |
| Completeness | Number of event alarms having finished reminding/total number of event alarms |

As described above, the event flow alarm clock can stop reminding in two situations. One situation is that the event alarms contained in the event flow alarm clock have all finished reminding and a next event alarm in the database of the event flow alarm clock cannot be read. The other situation is that the terminal receives an instruction from the user to turn off the alarm clock, to abort the alarm clock, or to cancel the alarm clock. In the second situation, the terminal does not read the next event alarm, and stops reminding. Each time after one event alarm finishes reminding, the terminal automatically marks the event alarm in the database. In other words, the terminal records the ID of an event alarm that has finished reminding. Thus, when the event flow alarm clock stops reminding, the terminal can count the number of event alarms that have finished reminding based on the recorded event alarm IDs, and obtain the completeness by calculating a ratio of the number of event alarms having finished reminding to the total number of event alarms contained in the event flow alarm clock.

The completeness is helpful for the user to timely adjust the event flow alarm clock. If the event flow alarm clock is often aborted by the user, it means that the setting of some event alarms is not reasonable. Therefore, some event alarms can be deleted or adjusted.

In some embodiments, after the completeness is calculated, the marks on the event alarms having finished reminding can be cleared from the database. When the event flow alarm clock is turned on next time, the event alarms having finished reminding can be marked again.

As shown in Table 2, the beginning time and finishing time of the event flow alarm clock can also be recorded to help the user understand the executive condition of the event flow alarm clock, such that the user can timely adjust the event flow alarm clock.

In some embodiments, an executable file can be created based on the database of the event flow alarm clock and sent to the cloud server to be downloaded by a user of another terminal. Alternatively, the executable file can be directly sent to another terminal. For example, the executable file of the event flow alarm clock can be sent to other users through social network software or published in a friend circle, to share with other users for reference. In some embodiments the completeness can also be shared.

Figure 2A:
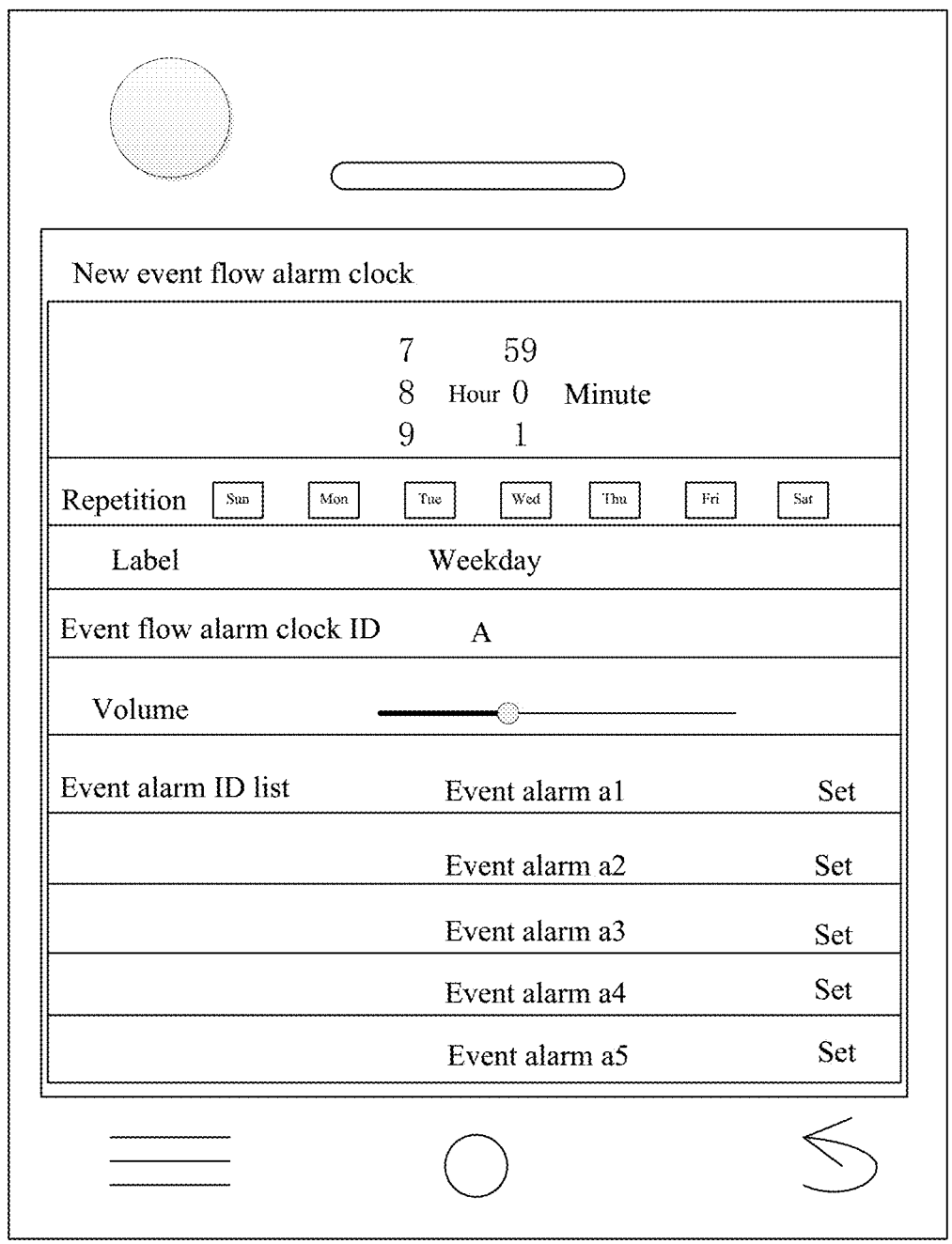
FIG. 2A is a schematic diagram showing an application scenario for reminding according to an exemplary embodiment of the present disclosure.

FIG. 2A is a schematic diagram showing an application scenario for reminding according to an exemplary embodiment of the present disclosure. In FIG. 2A, a cell phone is used as the terminal. The user may set the event flow alarm clock on the cell phone. As shown in FIG. 2A, when the user selects to add a new event flow alarm clock, the terminal displays a plurality of items for the user to set, which include a clock list, a repetition setting, a label, an event flow alarm clock ID, volume, and an event alarm ID list. Each event alarm ID corresponds to a setting option, so that the reminding information and reminding times of respective event alarms can be set separately.

Figure 2B:
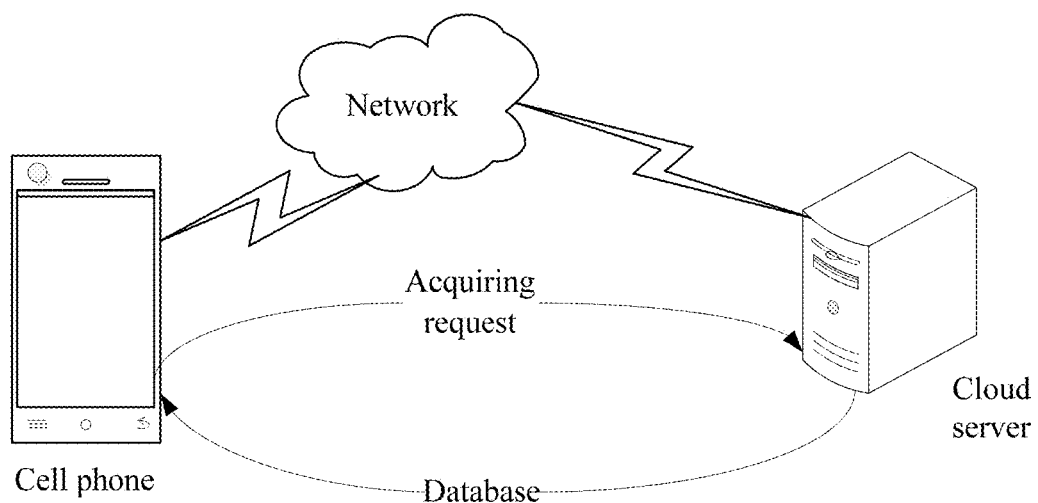
FIG. 2B is a schematic diagram showing an application scenario for reminding according to an exemplary embodiment of the present disclosure.

FIG. 2B is a schematic diagram showing an application scenario for reminding according to another exemplary embodiment of the present disclosure. The application scenario in FIG. 2B includes a cell phone and a cloud server. The cell phone constitutes the terminal. The cloud server is coupled with the cell phone via a network. In this scenario, the database is in the cloud server. When the cell phone sends to the cloud server a request for acquiring the database, the cloud server sends the database of the event flow alarm clock to the cell phone, so that the event flow alarm clock can be run on the cell phone.

After the event flow alarm clock is turned on, the terminal reads a reminding time and reminding information of an event alarm in the database, and outputs the corresponding reminding information when the reminding time arrives. Then, the terminal reads the database and judges whether a next event alarm exists. If the judgment result is yes, a reminding time and reminding information of the next event alarm is read and the corresponding reminding information is sent at the reminding time of the next event alarm. If the judgment result is no, or if an aborting instruction from the user is received, the terminal stops reading the database. Further, if no repetition is set for the event flow alarm clock, the event flow alarm clock is turned off.

Figure 3:
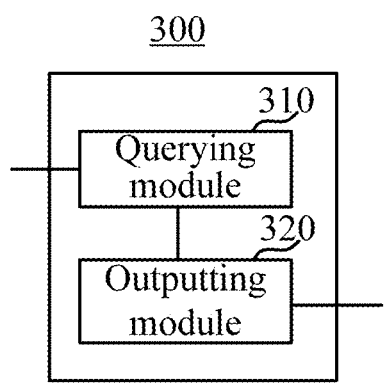
FIG. 3 is a block diagram illustrating a device for reminding according to an exemplary embodiment of the present disclosure.

FIG. 3 is a block diagram illustrating a device 300 for reminding based on alarm clock according to an exemplary embodiment of the present disclosure. The device 300 includes a querying module 310 and an outputting module 320. The querying module 310 is configured to query a database of an event flow alarm clock to judge whether a next event alarm exists. The event flow alarm clock contains at least two event alarms, and each event alarm of the at least two event alarms contains at least one event.

The outputting module 320 is configured to, when the querying module 310 judges that the next event alarm exists, output reminding information corresponding to the next event alarm at a reminding time of the next event alarm.

Figure 4:
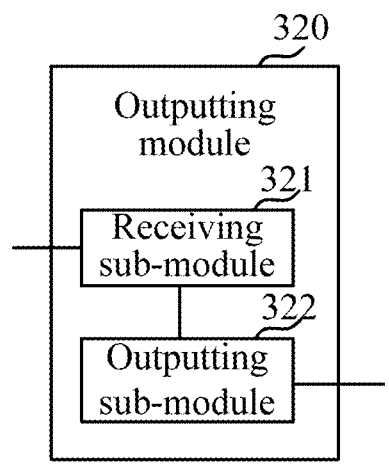
FIG. 4 is a block diagram illustrating an example of an outputting module shown in FIG. 3.

FIG. 4 is a block diagram illustrating an example of the outputting module 320. As shown in FIG. 4, the outputting module 320 includes a receiving sub-module 321 and an outputting sub-module 322. The receiving sub-module 321 is configured to receive the reminding information sent by a cloud server. The outputting sub-module 322 is configured to output the reminding information received by the receiving sub-module 321 at a preset time length.

Figure 5:
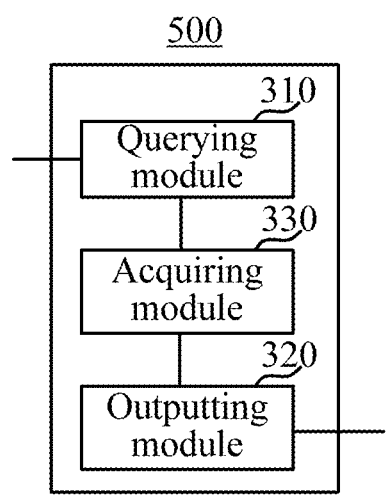
FIG. 5 is a block diagram illustrating a device for reminding according to another exemplary embodiment of the present disclosure.

FIG. 5 is a block diagram illustrating a device 500 for reminding according to another exemplary embodiment of the present disclosure. The device 500 is similar to the device 300, except that the device 500 further includes an acquiring module 330. The acquiring module 330 is configured to acquire the database of the event flow alarm clock from a cloud server.

Figure 6:
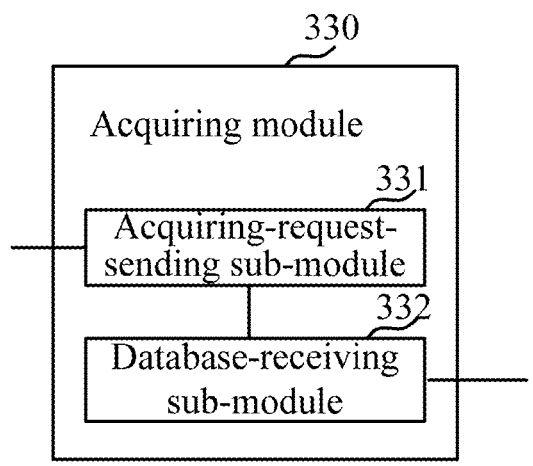
FIG. 6 is a block diagram illustrating an example of an acquiring module shown in FIG. 5.

FIG. 6 is a block diagram illustrating an example of the acquiring module 330. As shown in FIG. 6, the acquiring module 330 includes an acquiring-request-sending sub-module 331 and a database-receiving sub-module 332. The acquiring-request-sending sub-module 331 is configured to send a request for acquiring the database to the cloud server. The database-receiving sub-module 332 is configured to receive information of the database from the cloud server.

Figure 7:
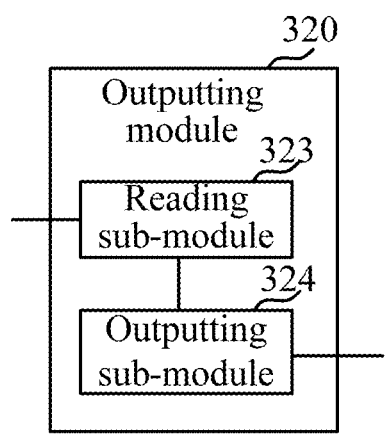
FIG. 7 is a block diagram illustrating another example of the outputting module.

FIG. 7 is a block diagram illustrating another example of the outputting module 320. As shown in FIG. 7, the outputting module 320 includes a reading sub-module 323 and an outputting sub-module 324. Wherein the reading sub-module 323 is configured to read reminding information corresponding to the next event alarm. The outputting sub-module 324 is configured to output the reminding information read by the reading sub-module 323 at a preset time length. The reminding information output by the outputting sub-module 324 includes any one or more of a ring tone, a voice, an image-text, and a video.

Figure 8:
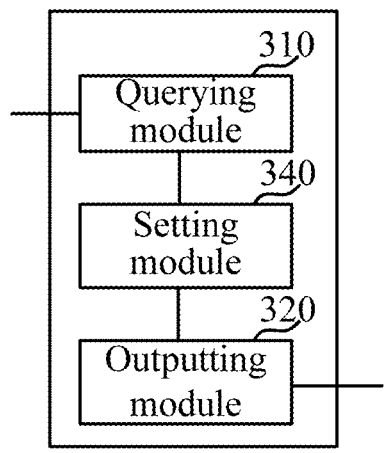
FIG. 8 is a block diagram illustrating a device for reminding according to another exemplary embodiment of the present disclosure.

FIG. 8 is a block diagram illustrating a device 800 for reminding according to another exemplary embodiment of the present disclosure. The device 800 is similar to the device 300, except that the device 800 further includes a setting module 340. The setting module 340 is configured to set reminding times and reminding information of respective event alarms contained in the event flow alarm clock in the database.

Figure 9:
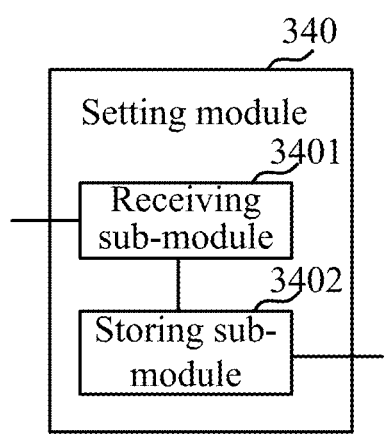
FIG. 9 is a block diagram illustrating an example of a setting module shown in FIG. 8.

FIG. 9 is a block diagram illustrating an example of the setting module 340. As shown in FIG. 9, the setting module 340 includes a receiving sub-module 3401 and a storing sub-module 3402. The receiving sub-module 3401 is configured to receive a time inputted by a user. The storing sub-module 3402 is configured to store the time received by the receiving sub-module 3401 as a reminding time of an event alarm being set.

Figure 10:
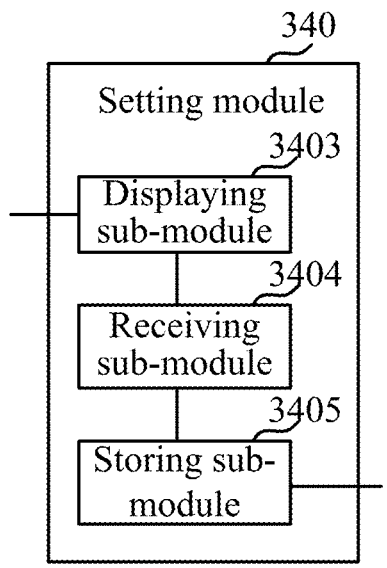
FIG. 10 is a block diagram illustrating another example of the setting module.

FIG. 10 is a block diagram illustrating another example of the setting module 340. As shown in FIG. 10, the setting module 340 includes a displaying sub-module 3403, a receiving sub-module 3404, and a storing sub-module 3405. The displaying sub-module 3403 is configured to output and display a list of times. The receiving sub-module 3404 is configured to receive a time selected by a user from the list of times displayed by the displaying sub-module 3403. The storing sub-module 3405 is configured to store the time received by the receiving sub-module 3404 as a reminding time of an event alarm being set.

Figure 11:
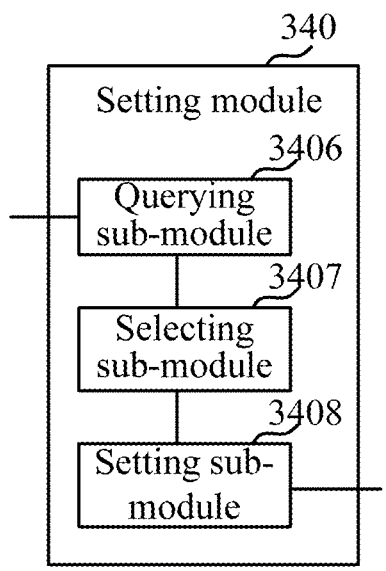
FIG. 11 is a block diagram illustrating another example of the setting module.

FIG. 11 is a block diagram illustrating another example of the setting module 340. As shown in FIG. 11, the setting module 340 includes a querying sub-module 3406, a selecting sub-module 3407, and a setting sub-module 3408. The querying sub-module 3406 is configured to query and display a list of unique identifications of existing alarm clocks. The selecting sub-module 3407 is configured to, according to a unique identification selected by a user from the list displayed by the querying sub-module 3406, select a corresponding alarm clock as an event alarm being set. The setting sub-module 3408 is configured to set a reminding time of the corresponding alarm clock selected by the selecting sub-module 3407 as a reminding time of the event alarm being set.

Figure 12:
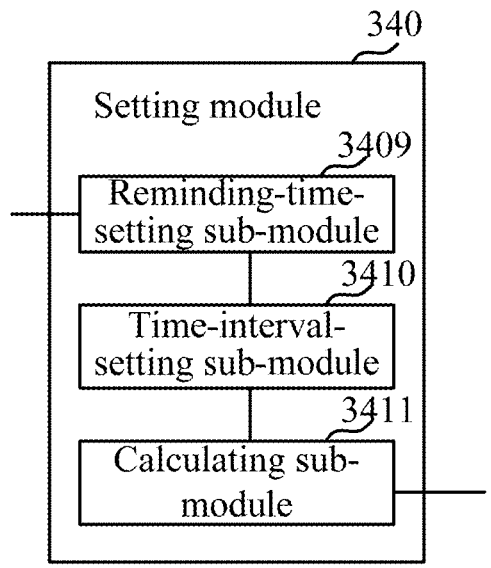
FIG. 12 is a block diagram illustrating another example of the setting module.

FIG. 12 is a block diagram illustrating another example of the setting module 340. As shown in FIG. 12, the setting module 340 includes a reminding-time-setting sub-module 3409, a time-interval-setting sub-module 3410, and a calculating sub-module 3411. The reminding-time-setting sub-module 3409 is configured to set a reminding time of a first event alarm contained in the event flow alarm clock. The time-interval-setting sub-module 3410 is configured to, for a second event alarm to a last event alarm contained in the event flow alarm clock, successively set a time interval between an event alarm being set and a previous event alarm. The calculating sub-module 3411 is configured to, based on the time interval set by the time-interval-setting sub-module 3410 and the reminding time of the previous event alarm, calculate a reminding time of the event alarm being set.

Figure 13:
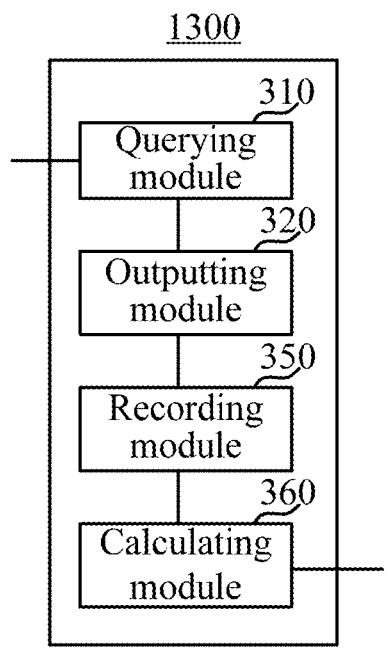
FIG. 13 is a block diagram illustrating a device for reminding according to another exemplary embodiment of the present disclosure.

FIG. 13 is a block diagram illustrating a device 1300 for reminding according to another exemplary embodiment of the present disclosure. The device 1300 is similar to the device 300, except that the device 1300 further includes a recording module 350 and a calculating module 360. The recording module 350 is configured to record a unique identification of an event alarm having finished reminding in the database. The calculating module 360 is configured to, when it is monitored that the event flow alarm clock has finished reminding, calculate completeness based on the unique identifications recorded by the recording module 350. The completeness is a ratio of the number of event alarms having finished reminding to the number of all event alarms in the event flow alarm clock.

Figure 14:
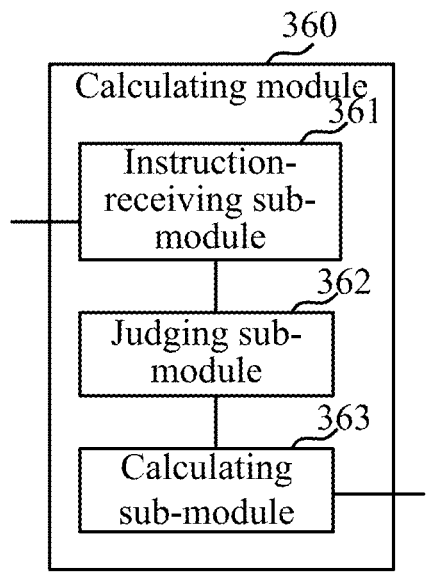
FIG. 14 is a block diagram illustrating an example of a calculating module shown in FIG. 13.

FIG. 14 is a block diagram illustrating an example of the calculating module 360. As shown in FIG. 14, the calculating module 360 includes an instruction-receiving sub-module 361, a judging sub-module 362, and a calculating sub-module 363. The instruction-receiving sub-module 361 is configured to receive an instruction from a user to abort the event flow alarm clock. The judging sub-module 362 is configured to query the database of the event flow alarm clock and judge whether a next event alarm exists. The calculating sub-module 363 is configured to, when the instruction-receiving sub-module 361 receives the instruction of aborting the event flow alarm clock or the judging sub-module 362 judges that no next event alarm exists, calculate the completeness based on the recorded unique identifications.

Figure 15:
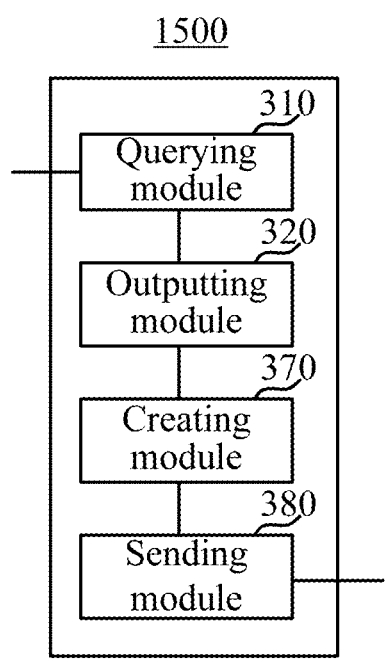
FIG. 15 is a block diagram illustrating a device for reminding according to another exemplary embodiment of the present disclosure.

FIG. 15 is a block diagram illustrating a device 1500 for reminding according to another exemplary embodiment of the present disclosure. The device 1500 is similar to the device 1300, except that the device 1500 further includes a creating module 370 and a sending module 380. The creating module 370 is configured to create an executable file based on the database of the event flow alarm clock. The sending module 380 is configured to send the executable file created by the creating module 370 to the cloud server.

In some embodiments, respective events in the event flow alarm clock can be correlated with each other.

Operations of the above-described exemplary devices are similar to the above-described exemplary methods, and thus their detailed description is omitted here.

The exemplary devices described above are merely illustrative. The units described as separate can be or not be physically separate, and the components illustrated as a unit can be or not be physical units, and can be at the same location or distributed to a plurality of units over the network. A part of or all of the modules can be selected to achieve the objective of the present disclosure as desired. One skilled in the art can understand and practice the embodiments without exercising creative labor.

Figure 16:
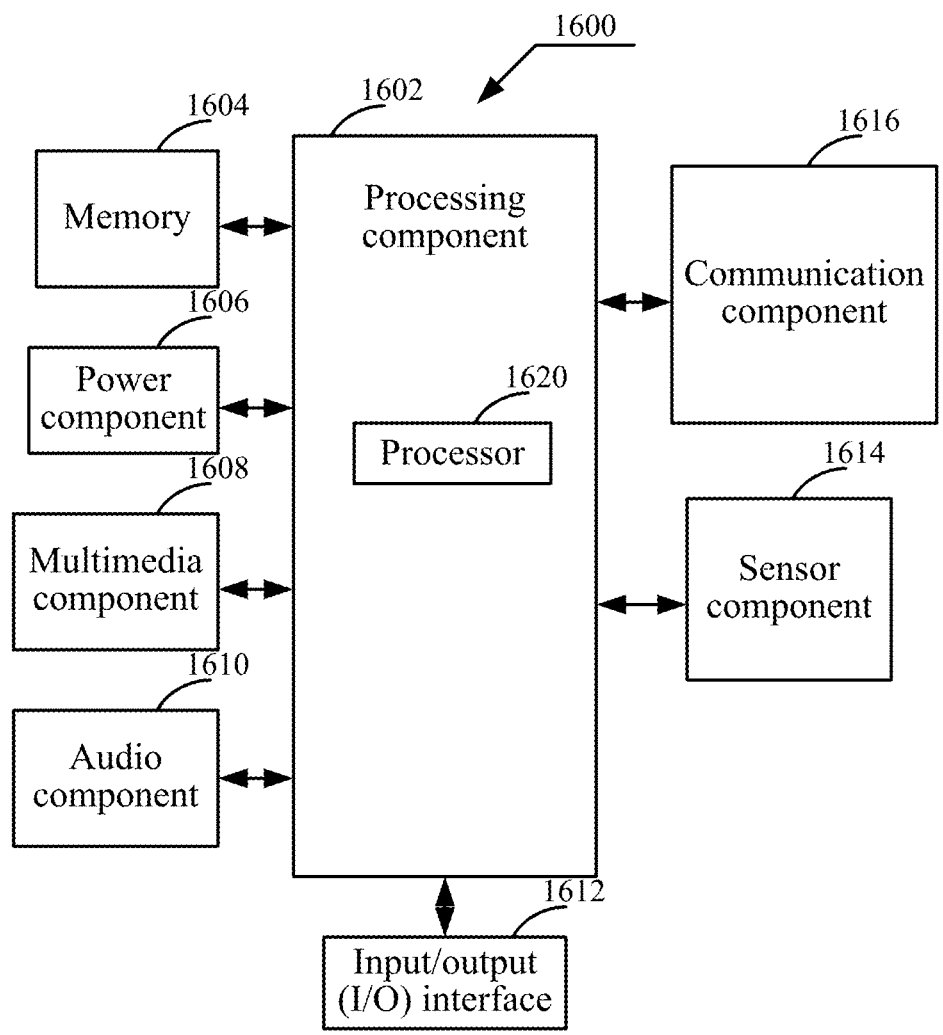
FIG. 16 is a block diagram illustrating a device for reminding according to another exemplary embodiment of the present disclosure.

FIG. 16 is a block diagram of a device 1600 for reminding according to another exemplary embodiment. For example, the device 1600 may be provided as a terminal, such as a cell phone. Referring to FIG. 16, the device 1600 includes one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of a method consistent with the present disclosure, such as one of the above-described exemplary methods. Moreover, the processing component 1602 may include one or more modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 may include a power management system, one or more power sources, and any other components associated with the generation, management, and distribution of power in the device 1600.

The multimedia component 1608 includes a screen providing an output interface between the device 1600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, keys, and the like. The keys may include, but are not limited to, a home key, a volume key, a starting key, and a locking key.

The sensor component 1614 includes one or more sensors to provide status assessments of various aspects of the device 1600. For instance, the sensor component 1614 may detect an open/closed status of the device 1600, relative positioning of components, e.g., the display and the keypad, of the device 1600, a change in position of the device 1600 or a component of the device 1600, a presence or absence of user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may further include a light sensor, such as a CMOS or CCD image sensor, for use in imaging applications. In some embodiments, the sensor component 1614 may further include an accelerometer sensor, a gyroscope sensor, a magnetic sensor, a pressure sensor, a microwave sensor, or a temperature sensor.

The communication component 1616 is configured to facilitate communication, wired or wirelessly, between the device 1600 and other devices. The device 1600 may access a wireless network based on a communication standard, such as WiFi, 2G, 3G, 4G, or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1720 in the device 1700, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

According to the present disclosure, multiple event alarms can be enabled by turning on one event flow alarm clock. As such, overall control of the multiple event alarms can be achieved and usability of the event alarms can be improved. A user does not have to spend extra time to control individual event alarms. Thus, more convenience can be provided to the user.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a terminal to perform reminding, comprising:
   outputting first reminding information according to a first event alarm of an event flow alarm clock at a first reminding time of the first event alarm, the event flow alarm clock containing at least two event alarms and being turned on and off as a whole;
   querying a database of the event flow alarm clock to judge whether a second event alarm exists, the database being stored in at least one of a cloud server or the terminal; and
   outputting, when there exists the second event alarm having a second reminding time later than the first reminding time, second reminding information according to the second event alarm at the second reminding time;
   wherein when the database is stored locally in the terminal, the method further comprises, before querying the database:
   setting reminding times and reminding information of the event alarms contained in the event flow alarm clock in the database, wherein setting the reminding times includes:
   setting a reminding time of a first one of the event alarms contained in the event flow alarm clock;
   for a second one of the event alarms to a last one of the event alarms contained in the event flow alarm clock, successively setting a time interval between an event alarm being set and a previous event alarm; and
   calculating, based on the time interval and a reminding time of the previous event alarm, a reminding time of the event alarm being set.

2. The method of claim 1, wherein when the database is stored in the cloud server, outputting the second reminding information includes:
   receiving the second reminding information sent by the cloud server; and
   outputting the second reminding information at a preset time length.

3. The method of claim 1, further comprising:
   acquiring the database when the database is stored in the cloud server, wherein acquiring the database includes:
   sending to the cloud server a request for acquiring the database; and
   receiving information of the database from the cloud server.

4. The method of claim 1, wherein when the database is stored locally in the terminal, outputting the second reminding information includes:
   reading the second reminding information from the database; and
   outputting the second reminding information at a preset time length.

5. The method of claim 4, wherein outputting the second reminding information includes:
   outputting at least one of a ring tone, a voice, an image-text, or a video.

6. The method of claim 1, wherein setting the reminding times of the event alarms includes, for an event alarm being set:
   receiving a time; and
   storing the time as a reminding time of the event alarm being set.

7. The method of claim 1, wherein setting the reminding times of the event alarms includes, for an event alarm being set:
   outputting and displaying a list of times;
   receiving a time selected from the list of times; and
   storing the selected time as a reminding time of the event alarm being set.

8. The method of claim 1, wherein setting the reminding times of the event alarms includes, for an event alarm being set:
   querying and displaying a list of identifications of existing alarm clocks;
   selecting, according to an identification selected from the list, a corresponding alarm clock as the event alarm being set; and
   setting a reminding time of the corresponding alarm clock as a reminding time of the event alarm being set.

9. The method of claim 1, further comprising, when the database is stored locally in the terminal:
   recording identifications of event alarms having finished reminding in the database;
   monitoring whether the event flow alarm clock has finished reminding;
   calculating, when it is monitored that the event flow alarm clock has finished reminding, completeness by calculating a ratio of a number of recorded identifications to a total number of the event alarms in the event flow alarm clock; and
   adjusting the event flow alarm clock based on the completeness.

10. The method of claim 9, wherein monitoring whether the event flow alarm clock has finished reminding includes:
    receiving an instruction of aborting the event flow alarm clock; or
    judging that the second event alarm does not exist.

11. The method of claim 1, wherein the event alarms are respectively associated with events that are correlated with each other.

12. A terminal, comprising:
    a processor; and
    a memory storing instructions that, when executed by the processor, cause the processor to:
    output first reminding information according to a first event alarm of an event flow alarm clock at a first reminding time of the first event alarm, the event flow alarm clock containing at least two event alarms and being turned on and off as a whole;
    query a database of the event flow alarm clock to judge whether a second event alarm exists, the database being stored in at least one of a cloud server or the terminal; and
    output, when there exists a second event alarm having the second reminding time later than the first reminding time, second reminding information according to the second event alarm at the second reminding time;

wherein when the database is stored locally in the terminal, the instructions further cause the processor to, before querying the database:

set reminding times and reminding information of the event alarms contained in the event flow alarm clock in the database, wherein the instructions further cause the processor to:

set a reminding time of a first one of the event alarms contained in the event flow alarm clock;

for a second one of the event alarms to a last one of the event alarms contained in the event flow alarm clock, successively set a time interval between an event alarm being set and a previous event alarm; and calculate, based on the time interval and a reminding time of the previous event alarm, a reminding time of the event alarm being set.

13. The terminal of claim 12, wherein the instructions further cause the processor to, for an event alarm being set:

query and display a list of identifications of existing alarm clocks;

select, according to an identification selected from the list, a corresponding alarm clock as the event alarm being set; and set a reminding time of the corresponding alarm clock as a reminding time of the event alarm being set.

14. The terminal of claim 12, wherein the instructions further cause the processor to, when the database is stored locally in the terminal:

record identifications of event alarms having finished reminding in the database;

monitor whether the event flow alarm clock has finished reminding;

calculate, when it is monitored that the event flow alarm clock has finished reminding, completeness by calculating a ratio of a number of recorded identifications to a total number of the event alarms in the event flow alarm clock; and adjust the event flow alarm clock based on the completeness.

15. A non-transitory storage medium having stored therein instructions that, when executed by one or more processors of a mobile terminal, cause the mobile terminal to:

output first reminding information according to a first event alarm of an event flow alarm clock at a first reminding time of the first event alarm, the event flow alarm clock containing at least two event alarms and being turned on and off as a whole;

query a database of the event flow alarm clock to judge whether a second event alarm exists, the database being stored in at least one of a cloud server or the terminal; and output, when there exists a second event alarm having the second reminding time later than the first reminding time, second reminding information according to the second event alarm at the second reminding time;

wherein when the database is stored locally in the terminal, the instructions further cause the mobile terminal to, before querying the database:

set reminding times and reminding information of the event alarms contained in the event flow alarm clock in the database, wherein the instructions further cause the mobile terminal to:

set a reminding time of a first one of the event alarms contained in the as event flow alarm clock;

for a second one of the event alarms to a last one of the event alarms contained in the event flow alarm clock, successively set a time interval between an event alarm being set and a previous event alarm; and calculate, based on the time interval and a reminding time of the previous event alarm, a reminding time of the event alarm being set.

* * * * *